Feb. 24, 1970    R. A. DONGES    3,497,260
SEAT STRUCTURE

Filed March 18, 1968    2 Sheets-Sheet 1

INVENTOR.
RICHARD A. DONGES
BY
ATTORNEYS

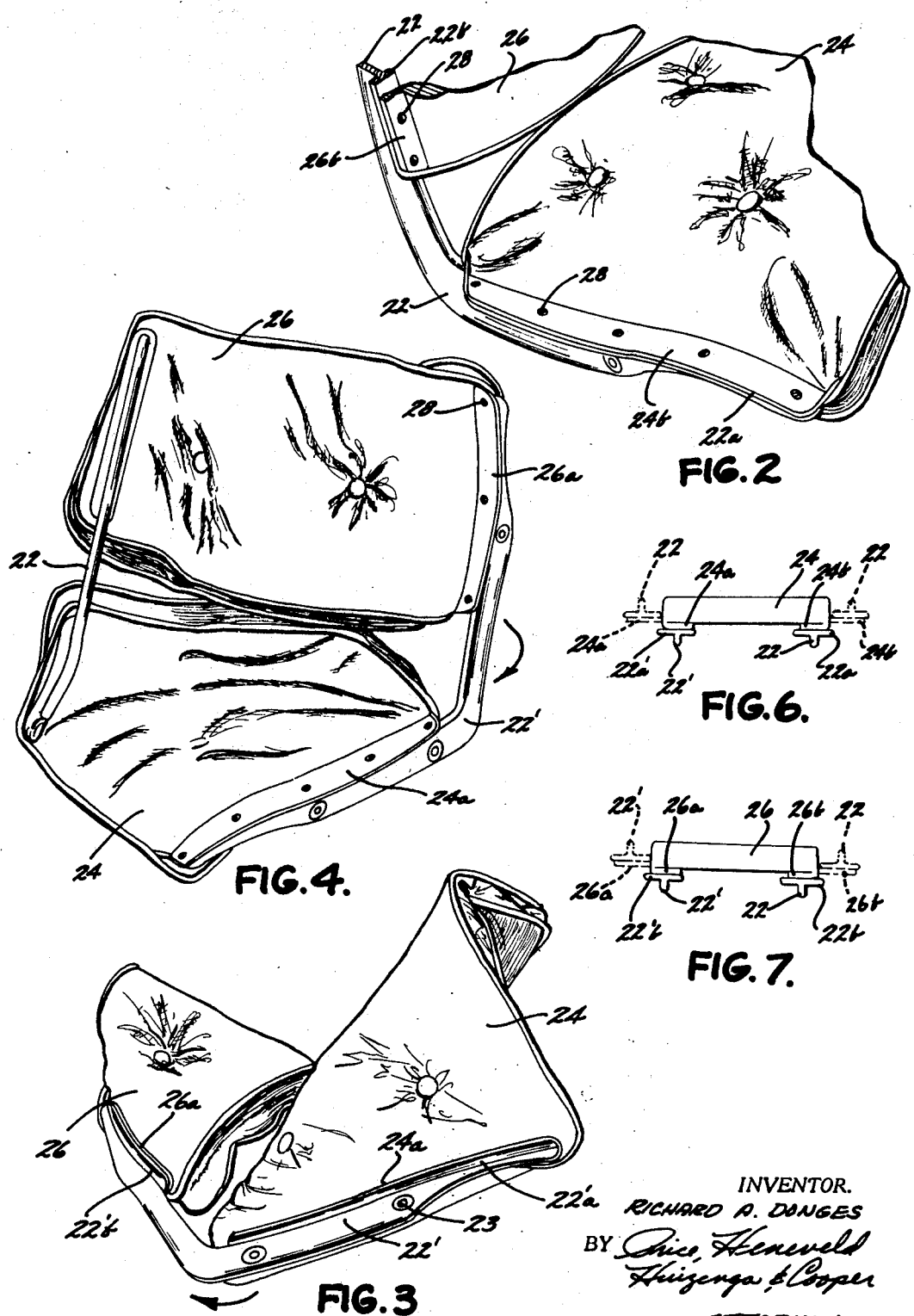

United States Patent Office 3,497,260
Patented Feb. 24, 1970

3,497,260
SEAT STRUCTURE
Richard A. Donges, Los Angeles, Calif., assignor to Herman Miller, Inc., Zeeland, Mich., a corporation of Michigan
Filed Mar. 18, 1968, Ser. No. 713,768
Int. Cl. A47c 7/18, 7/02
U.S. Cl. 297—449
6 Claims

ABSTRACT OF THE DISCLOSURE

This specification discloses a suspension seat structure and method of assemblying a seat structure, involving a pair of spaced, paralled L-shaped supports, a pair of flexible membranes suspended between the supports, and spreader elements retaining the supports spaced. These components are specially assembled with the supports laterally inverted, and the membranes inverted. The membrane edges overlap the legs of the supports and are secured thereto. The supports are then rotated toward each other and through 180° to shift them and said membranes from their inverted condition to the final orientation, causing the fastened membrane edges to be folded under out of sight between the membranes and supports. The spreader elements are then secured between the supports.

Preferably, a pair of L-shaped arm rests are each secured to the vertical and horizontal legs of the supports by the same fasteners that secure the spreaders to the supports.

BACKGROUND OF THE INVENTION

This invention relates to seating, and more particularly to suspension seating and a method of seating assembly.

Suspension seating employing flexible membranes suspended between rigid supports affords excellent comfort and styling characteristics, as well as substantial simplicity of construction. Hence, it is being widely adopted. Along the membrane lateral edges, however, where they are fastened to the rigid supports, special efforts have had to be taken to cover and/or camouflage the fastenings to prevent unsightliness and potential injury.

Several techniques have been developed to do this. A few are very effective commercially, but still are rather complex and costly to manufacture and assemble.

SUMMARY OF THE INVENTION

This present invention provides a suspension seating construction and method of assembly that obviates the previous relatively complex devices and techniques for hiding the fasteners and fastened edges of the membranes while allowing rapid, secure, direct, simple mounting of the membranes by direct insertion of regular fasteners such as screws. Even without any added cover elements or the like, the fasteners are positioned in fully hidden condition by manipulation of the seat elements. Assembly is therefore rapid and simple, with a minimum of structural components.

Moreover, the arm rests, if desired, are attached to the seat with no additionally required fasteners.

Therefore it is an object of this invention to provide a simplified, attractive, sturdy, stylish suspension seat structure having unique edge construction and using a minimum of components.

Another object of this invention is to provide a unique method of assembly of suspension seating, that enables rapid, easy direct fastening of the membranes to the supports, but with resulting attractiveness due to the fasteners being completely hidden from view.

These and other related objects will become apparent from studying the following description in conjunction with the drawings.

BRIEF DESCRIPTION OF THE DRAWINGS

FIG. 2 is a fragmentary perspective view showing the first assembly step of the novel seat construction;

FIG. 3 is a fragmentary perspective view showing the first stages of the inversion process of the assembly method;

FIG. 4 is a perspective view showing the completion of the inversion process in FIG. 3;

FIG. 6 is a schematic view of the structure, showing the assembly technique taken in a direction VI—VI of FIG. 1;

FIG. 7 is a schematic view of the seat back showing the assembly technique, taken in a direction VII—VII of FIG. 1.

DESCRIPTION OF PREFERRED EMBODIMENT

Figure 1:
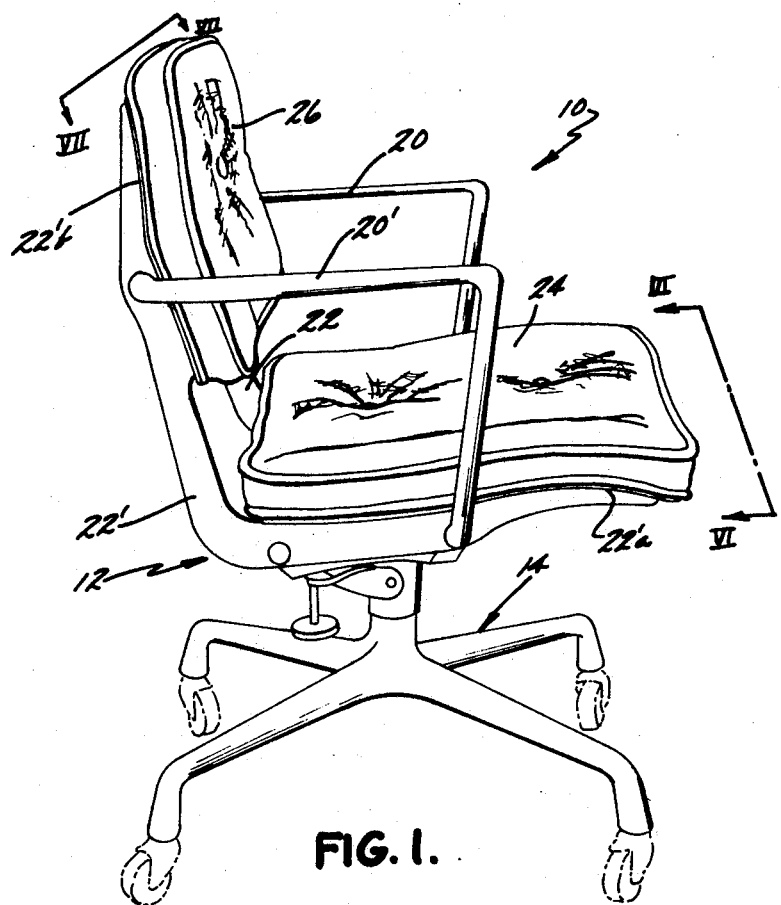
FIG. 1 is a perspective view of a chair employing the novel seat structure and method.

Referring now specifically to the drawings, the novel seat structure and method of assembly are illustrated in the preferred embodiment 10 the assembly comprises seat sub assembly 12 and pedestal sub assembly 14. Basically, pedestal sub assembly 14 may assume any of several different forms, and may or may not include castors as shown in phantom. This pedestal is attached to the seat by a yoke sub assembly 16 which also forms a spreader member for the seat bottom in the novel construction. The seat back also has a spreader member 18, as will be described more specifically hereinafter. Preferably, the seat structure includes a pair of V- or L-shaped arm support members 20 and 20', but these are not essential to the structure.

The basic components of seat sub assembly 12 include a pair of spaced L-shaped supports 22 and 22', a suspended seat membrane 24, a suspended back membrane 26, and the two noted spreader members. Seat and back members 24 and 26 constitute flexible suspended membranes which may include internal cushioning material as shown, with these membranes being suspended between the two spaced supports 22 and 22'. Each support includes a vertically upwardly extending back support leg and a horizontally forwardly extending seat support leg.

Each of the seat and back membranes includes a pair of laterally protruding web type edge mounting strips integral therewith. These are securely fastened to the supports by fasteners such as screws, but are folded out of sight in the final structure to be hidden and to hide the fasteners themselves. The result is a very sturdy construction which is relatively easy to assemble, while producing an attractive structure where the secure fasteners and webs are not visible.

The structural elements and the assembly method are such that the supports and membranes are fastened together in inverted condition, i.e. with the support member outer lateral faces being inwardly and their inner lateral faces being outwardly, the seat membrane being upside down, and the back member being backwards. Then the structure is inverted by rotating the two supports toward and past each other, each through a complete 180° angle, to place the support outer faces outwardly, to place the seat upright and back forwardly. This is normally done by rotating two of the legs, e.g. the horizontal ones directly toward and past each other through a 180° arc while the other two legs merely rotate on their axes through 180°. This requires considerable temporary flexing and distortion of one of the membranes, particularly when these are thick cushioned elements. The membranes therefore must be highly flexible, and preferably slightly stretchable.

After this inversion process, transverse spreader members 16 and 18 are attached to and between the respective horizontal and vertical legs to keep the components properly positioned under stress. Also, the arm members may be attached to the supports using the same fasteners that secure the spreader members to the supports.

The supports have a cross sectional T-shaped configuration where the membranes attach. This T-shaped configuration is preferably discontinuous in the bend area where the respective horizontal legs converge into the vertical legs, for styling purposes. Described in another way, supports 22 and 22' each have a flat integral web 22a and 22'a, and each has mounting integral webs on the vertical legs, i.e. 22b and 22'b. The integral lateral elongated mounting strips 24a and 24b of seat 24, and 26a and 26b of back 26 are attached to these webs by a plurality of fasteners such as screws 28. After these fasteners are secured through both edges of both membranes, the assembler manually grasps both supports 22 and 22' and physically rotates them such that one pair of the legs e.g. the horizontal legs of the supports as shown are turned inwardly toward each other, past each other, and apart again from each other so that each passes through an arc of rotation of 180°. This causes the outer lateral surfaces of these supports to be turned outwardly to the final position. This operation is shown in FIGS. 3 and 4, with the structure in FIG. 4 shown almost completely rotated except that support 22' is just being turned through its last 90°. This rotation causes the strips 24a and 24b and 26a and 26b to be folded underneath the seat cushion and folded behind the back of the back cushion completely out of sight, and also covers the screw heads since these are then positioned between the support webs and the cushion edge mounting strips.

Figure 5:
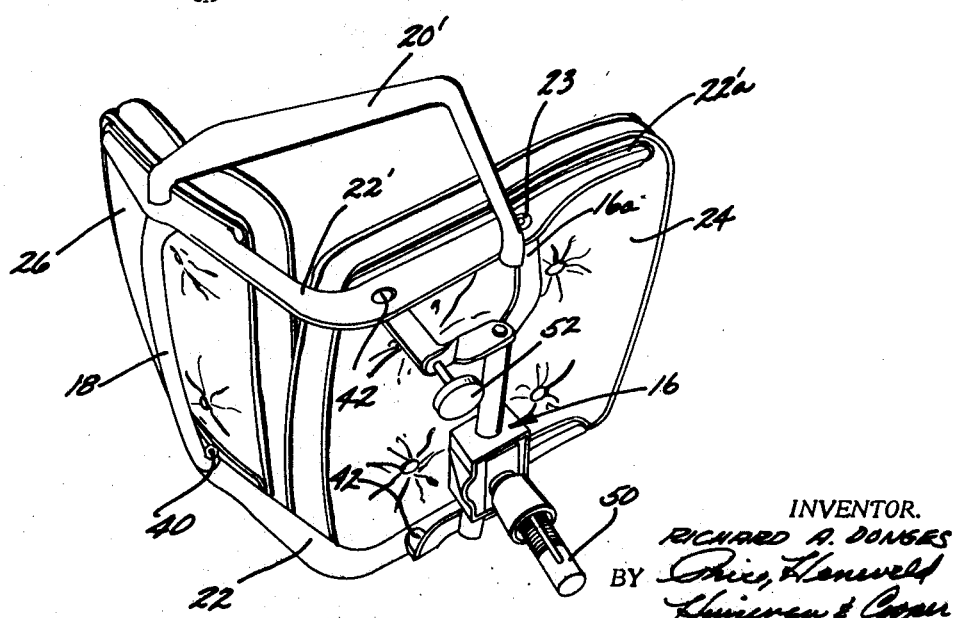
FIG. 5 is a bottom perspective view of the underside of the seat structure, showing the attachment of the arms and spreader elements.

To secure the elements in this condition, spreader compression member 18 is mounted between the two back legs by inserting fasteners such as bolts 40 (FIG. 5) through the ends of spreader 18 and into the vertical legs of supports 22 and 22'. If desired, the upper ends of arms 20 and 20' may also be secured by extending these fasteners through the hollow upper ends of the arms after passage through the supports. Then, spreader member or sub assembly 16, which preferably has four arms and forms the mounting yoke for pedestal 14, is inserted between the horizontal legs of supports 22 and 22'', and secured thereto by suitable fasteners 42 through the rear arms and like fasteners through the front arms 16a and into the horizontal legs of supports 22 and 22'. Likewise, the lower ends of arm rests 20 and 20' may be mounted to supports 22 and 22' by the same front fasteners that secure the forward arms of spreader sub assembly 16. This is done by inserting the fastener from the inside, through the legs of the spreader, through the horizontal legs of the supports, and then aligning the lower ends of the arms from the position illustrated, for example, in FIG. 5 into alignment with openings 23 in the supports, so that the fastener passes into the lower end of the arms.

To complete the assembly, pedestal 14 is attached to the depending central post 50 of sub assembly 16. The chair may include a suitable tilt adjustment mechanism 52 in conventional manner.

It is conceivable that the method of assembly and the structural components of this assembly may be modified in various manners without departing from the unique concept presented.

The embodiments of the invention in which an exclusive property or privilege is claimed are defined as follows:

1. A suspension seat structure comprising: a pair of spaced L-shaped rigid supports, each having a horizontal leg and a vertical leg; a flexible suspension seat bottom membrane extending between and overlying the horizontal legs of said supports, and a flexible seat back membrane extending between and overlying the vertical legs of said supports; each of said membranes having mounting strips extending from the opposite lateral edges thereof, each said mounting strip being folded back 180° with respect to its membrane and lying between the respective overlying membrane and the respective one of said support legs; enlarged head fasteners securing said strips to said legs with the enlarged heads thereof being between the respective mounting strips and membranes to be covered by said overlying membranes; and spreader means extending between and mounted to said supports.

2. The seat structure in claim 1 wherein a first spreader element extends between and has ends secured to said vertical support legs to maintain said mounting strips of said seat back membrane in their 180° position, and a second spreader element extends between and has ends secured to said horizontal support legs to maintain said mounting strips of said seat bottom in their 180° position.

3. The seat structure in claim 2 including a pair of arm rests, each being generally of an L-shaped configuration with a horizontal leg secured to said vertical support leg and a vertical leg secured to said horizontal support leg and wherein a fastener on the vertical leg of each said support secures to said support both an end of said first spreader element and the horizontal leg of the respective arm rest.

4. The seat structure in claim 3 wherein a fastener on the horizontal leg of each said support secures to said support both an end of said second spreader element and the vertical leg of the respective arm rest.

5. A method of assembling a suspension seat structure employing a pair of flexible membranes for the seat back and bottom and a pair of L-shaped side support members, comprising the steps of: positioning the L-shaped supports with the inner lateral surfaces out and the outer lateral surfaces in; extending the two membranes, in inverted condition, between the vertical and the horizontal legs of the supports, with the membrane edges extending beyond the respective membranes and overlapping the respective legs of said supports, and fastening said extending edges to said legs; rotating said supports in toward each other and through 180°, while flexing and temporarily distorting said membranes, to a final position where the outer support surfaces are out, the membranes are no longer inverted, and the fastened edges are rolled in a manner to be between the respective membranes and supports such that the membranes cover the fastened areas, and securing said supports in such final position.

6. A method of assembling a seat structure, employing a pair of flexible membranes, a pair of L-shaped supports, and a pair of spreader elements, comprising the steps of: positioning the L-shaped supports in spaced relationship with the inner lateral surfaces out and the outer lateral surfaces in; extending one of the membranes, in inverted condition, between the horizontal legs of the supports, with the membrane edges extending further and overlapping the legs, and fastening said extending edges to said legs; extending the other membrane, in inverted condition, between the vertical legs of the supports, with the membrane edges extending further and overlapping the legs, and fastening said extending edges to said legs; rotating said supports in toward each other and through 180°, while flexing and temporarily distorting said membranes, to a final position where the outer support surfaces are out, the membranes are no longer inverted, and the fastened edges are folded under and back between the membranes and the legs in a manner that the membranes cover the fastened edges; and securing the spreader elements between the respective horizontal and vertical legs of the supports to maintain their spaced relationship.

References Cited

UNITED STATES PATENTS

| | | | |
|---|---|---|---|
| 2,901,028 | 8/1959 | Bottemiller | 297—421 X |
| 3,024,068 | 3/1962 | Eames | 297—455 |
| 3,041,109 | 6/1962 | Eames et al. | 297—449 |
| 3,109,679 | 11/1963 | Eames | 297—458 |
| 3,124,390 | 3/1964 | Eames et al. | 297—452 X |
| 3,399,926 | 9/1968 | Hehn | 297—452 X |

CASMIR A. NUNBERG, Primary Examiner

U.S. Cl. X.R.

297—445, 455